March 9, 1943.  R. F. SCOTT ET AL  2,313,175
VACUUM DISTILLATION PROCESS AND APPARATUS
Filed March 20, 1941  2 Sheets-Sheet 1

INVENTORS
ROBERT F. SCOTT
ARGYLE C. PLEWES
BY
ATTORNEY

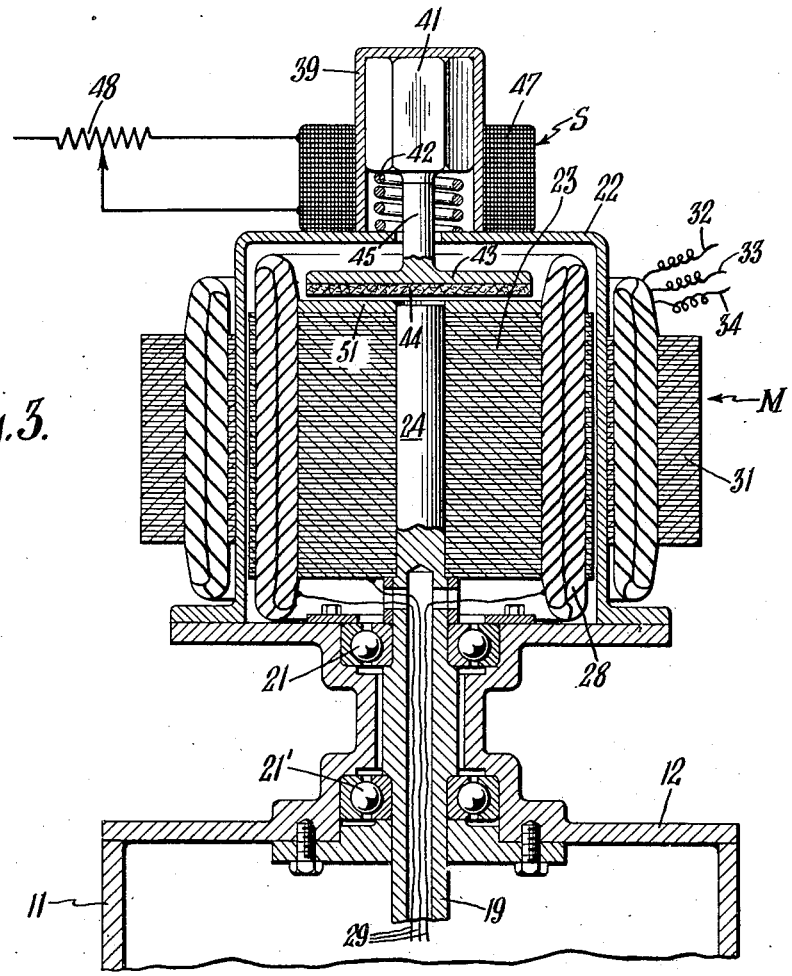
Fig. 3.
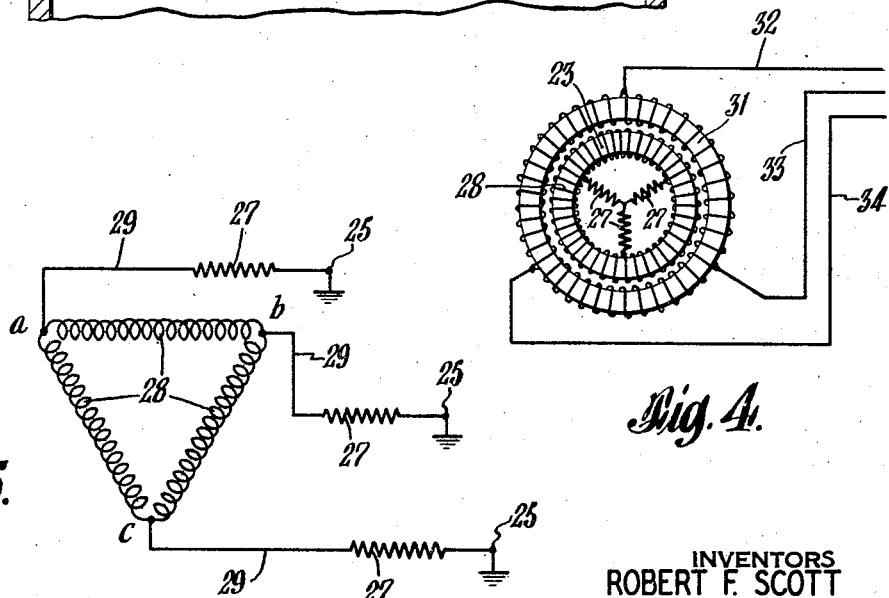
Fig. 4.
Fig. 5.
INVENTORS
ROBERT F. SCOTT
ARGYLE C. PLEWES
BY
ATTORNEY Patented Mar. 9, 1943

2,313,175

UNITED STATES PATENT OFFICE 2,313,175

VACUUM DISTILLATION PROCESS AND APPARATUS

Robert F. Scott, St. Albans, and Argyle C. Plewes, South Charleston, W. Va., assignors to Carbide and Carbon Chemicals Corporation, a corporation of New York Application March 20, 1941, Serial No. 384,320

12 Claims. (Cl. 202—52)

This invention relates to the distillation of fluids under high vacuum conditions; and more especially it concerns a novel process and apparatus for high vacuum distillation with fractionation under conditions where the vaporizing and condensing surfaces are separated by substantially unobstructed space. It has special utility for separating the constituents of fluid mixtures by short path or so-called molecular distillation under high vacuum.

One of the most difficult problems confronting the chemical industry involves the purification of organic compounds under high vacuum, particularly where a high-capacity unit which will yield a distilled product of high quality is desired. This is especially true when distilling organic compounds which require such a high temperature for their distillation, even under vacuums as high as 1 or 2 mm. of mercury that decomposition of such compounds occurs. Consequently apparatus is now available whereby it is possible to distill liquids by so-called short path or molecular distillation procedures at extremely low absolute pressures within the range from around 0.1 to 0.001 mm. of mercury whereby the distillation may be conducted at temperatures below that at which the material being distilled is substantially decomposed.

During high vacuum distillation in stills of the molecular type, particles of the material existing within the bulk of the film of liquid to be distilled move between closely spaced vaporizing and condensing surfaces. The rate of distillation is limited by the rate of diffusion to the surface of vaporization of the component to be vaporized. Since such transfer by diffusion alone is exceedingly slow, procedures have been devised for introducing the distilland upon a succession of heated rotary members within the highly vacuumized still. The unvaporized liquid is moved in a turbulent condition over the surface of each member and from the outer margins thereof and is then directed to the next lower heated member for further treatment. Heretofore apparatus effective for this purpose included a series of plates secured to a rotatable shaft which extended through the still wall and was driven from outside the still by suitable means. The heat required for the distillation generally is provided by electric resistance elements supported independently of the plates in fixed position and connected through the still walls with a suitable source of electric current. The problem of holding the extremely high vacuums required in distillation processes of the type herein mentioned is rendered very difficult in instances where moving parts must extend through the still wall, and reliance be placed upon the usual packing glands. Moreover, the heating means utilized neceessarily are spaced at some distance from the surfaces to be heated thereby, with the result that heat transfer is not as efficient as desired.

Among the more important objects of the invention are: To improve the rate of heat exchange and that of vaporization during high vacuum distillations; to provide in novel manner for preventing substantial loss of vacuum during high vacuum distillation in stills having rotating parts therein; to provide for rotating vaporizing elements and/or condensing elements within a high vacuum still by power generated within said still; to provide for heating vaporizing elements within a still under high vacuum by means of energy generated within the still; to provide for minimizing losses due to decomposition of substances being distilled under short path high vacuum conditions; and to provide a self-contained unit for conducting high vacuum distillations utilizing rapidly rotating vaporizing elements and condensing elements. These and other objects will be apparent from a review of the following description and claims.

Referring to the accompanying drawings in which certain preferred embodiments of the invention have been illustrated.

Fig. 3 is a section through a portion of the still of Figs. 1 and 2, showing one form of associated induction motor and heat-regulating device, and a modified motor support and bearing structure;

Fig. 4 is a diagram showing the wiring arrangement of the induction motor with the leads to the plate heating elements; and Fig. 5 is a wiring diagram of the electric heating circuit that includes the rotor windings and the heating elements.

Figures 1, 2:
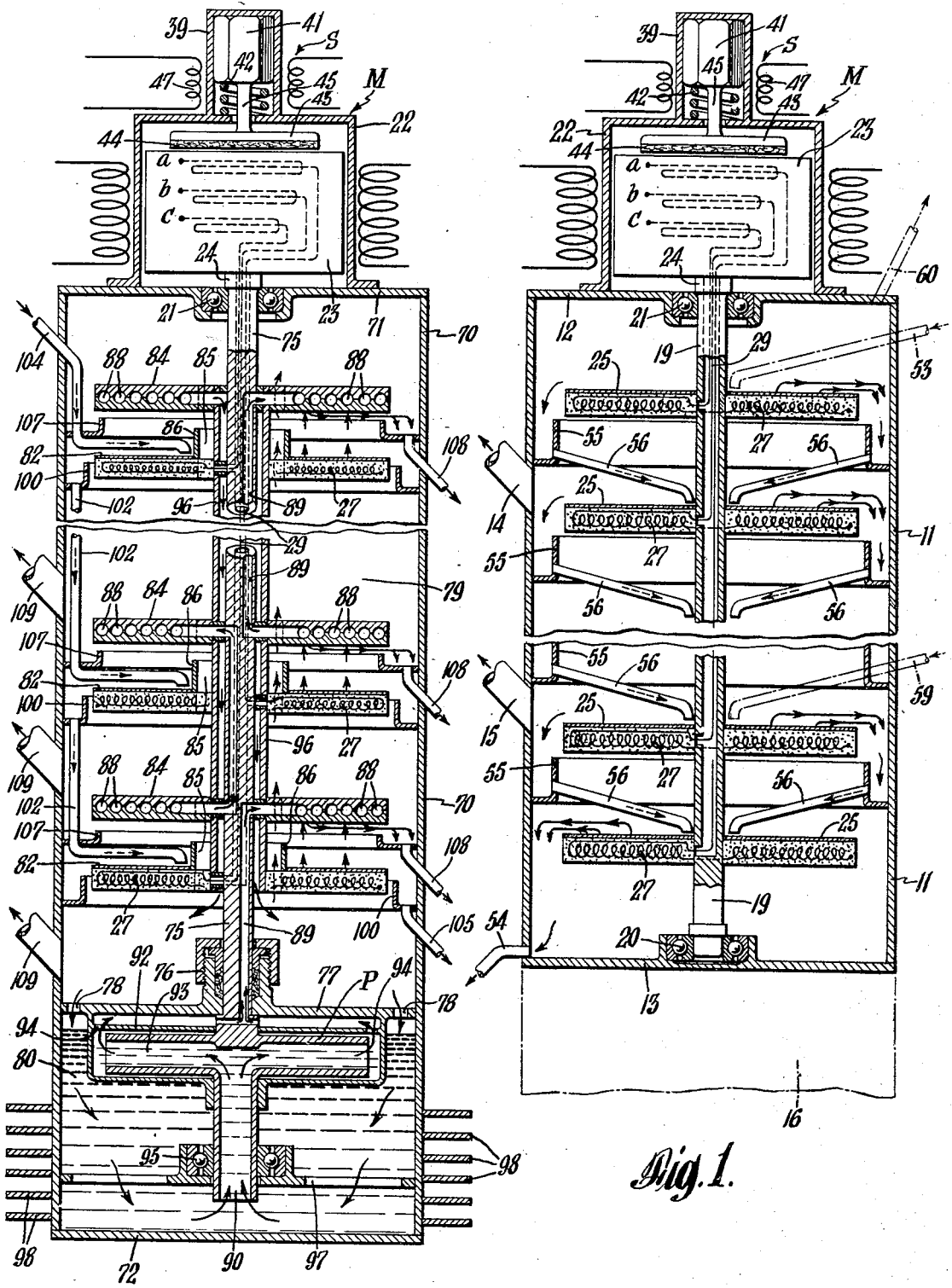
Fig. 1 is a vertical section through a preferred type of high vacuum still and associated elements, parts being broken away, and other parts being shown diagrammatically.
Fig. 2 is a vertical section through another preferred type of high vacuum still and associated elements, parts being broken away, and other parts being shown diagrammatically.

Referring to Fig. 1, numeral 11 designates a vacuum-tight vertical casing of suitable material, such as a ferrous or non-ferrous alloy or glass, provided with end plates 12, 13; and with vertically-spaced vapor outlet lines 14, 15, respectively connected with high vacuum pumps (not shown). While the casing 11 preferably is operated as an independent self-contained unit, it may be secured to a kettle 16 of a still, in which case passages may be formed in the plate 13 for conducting vapors from the kettle into the casing.

A vertical shaft 19 is disposed centrally of the casing 11, and is supported at its lower end by the thrust bearing 20. A fluid-tight housing 22 of non-magnetic metal or the equivalent is secured upon plate 12 and houses the rotor 23 of an induction motor M. The rotor shaft 24 may be integral with or may be secured by suitable means to the shaft 19, and serves to drive the latter. The rotor shaft may be rotatably supported at spaced points by suitable opposed thrust bearings 21, 21' (see Fig. 3), carried by shouldered portions of housing 22, and secured in suitable retaining plates. It will be seen that the rotor is hermetically sealed from the atmosphere. It also may be insulated in suitable manner against heat flow thereto from the still head.

Rigidly secured to shaft 19 are a plurality of vertically-spaced vaporizing plates 25, each provided with means, which may be integral therewith, for heating its upper surface. Each of such heating means comprises, in the form shown, an electric resistance element 27 having one end grounded upon the plate 25 heated thereby. The other end of each element 27 is connected with the windings 28 of rotor 23 at one of three spaced points a, b and c along said windings (see Fig. 5) by means of well insulated lead wires 29 in a typical "delta" arrangement. The elements 27 are connected in Y-formation to rotor 23. If the still contains more than three plates the hookup is the same, except that any one element 27 may contain one or more resistances connected in series, parallel or series-parallel.

For driving the induction motor M, electric power is supplied to the externally wound stator 31 as three-phase energy from a suitable source of power through lines 32, 33, 34.

The arrangement of parts is such that when current flows to the stator through lines 32 to 34, the rotor 23 is driven by the induction of its magnetic field through non-magnetic housing 22, thereby rotating shaft 19 and associated plates 25. No need is occasioned for the use of packing glands or the like, hence this common source of vacuum losses has been eliminated. The electric current flowing in the stator windings establishes a rotating field of magnetism in well known manner. The rotor, provided with the usual conductors for electric and magnetic fields, acts as a secondary to the stator; and a magnetic field is established in it, always rotating but lagging behind the stator's field— i. e., at a speed less than synchronous. During operation of the induction motor an electric resistance is imposed in the rotor electric circuit that controls the speed and torque characteristics.

It has been determined that part of the energy delivered to the rotor windings 28 may be used advantageously for generating heat in the elements 27 associated with the rotating plates 25, and that, in many instances, this provides sufficient heat for vaporizing liquids being distilled, when using the apparatus either as a fractionating column or as a "topping" still or degassing column wherein only the more volatile substances, gases, and the like are removed. The amount of heat required at each plate 25, and therefore the design of the heating elements 27, depend upon the use to which the still is to be placed. Where it is used for degassing liquids, heat may be supplied to each successive plate, in a direction away from the crude liquid inlet line, to maintain successive plates either at the same temperature or at progressively higher temperatures. When, however, the unit is used as a column still, the major portion of the heat energy is supplied at the plate adjacent the liquid inlet; and sufficient additional heat is supplied to each of the other plates to overcome heat losses by conduction and radiation.

The present invention also provides for electrically heating each vaporizing plate to a selected constant temperature, or for varying the temperature of each plate as desired, by supplying to the elements 27 increased amounts of electric energy generated within the still and associated parts, without appreciably changing the rotational speed of the plates 25. This is accomplished, in the preferred practice of the invention, by means of a solenoid-operated brake acting upon rotor 23 to retard its speed slightly, thereby still further throwing the latter out of synchronism with the stator revolving field. More lines of force of the revolving magnetic field are cut by the rotor's conductors, hence more current is generated in the rotor circuit, and is converted to heat at the respective resistance elements 27.

For regulating the amount of heat developed at the plates 25, a hollow vacuum-tight shell 39 of non-magnetic metal or the equivalent is formed upon or is integral with housing 22, and is in alignment with rotor shaft 24. An armature 41 of a solenoid S is supported within shell 39 for vertical movement toward and from the rotor shaft. A compression spring 42 is operatively interposed between armature 41 and margins of housing 22 surrounding an aperture in the latter. A flat plate 43, having its lower surface provided with a friction lining 44, is connected with armature 41 by connector 45. The armature and the shell 39 are octagonal or otherwise non-circular in cross-section for preventing rotation of one with respect to the other during operation.

For energizing the solenoid S, a primary coil 47 surrounds shell 39 and has its terminals arranged in an electric circuit containing the source of current and a variable resistance 48. Current flowing in coil 47 energizes the armature and causes it to press the lining of plate 43 against the matching metal face plate 51 secured upon rotor 23 (see Fig. 3), the degree of pressure thus exerted depending upon the current passing through coil 47. When the flow of current through that coil is discontinued, spring 42 raises the armature and plate 43 out of contact with plate 51, thus eliminating the braking effect.

When utilizing the apparatus of Fig. 1 as a degassing column, the liquid to be degassed is delivered to the uppermost plate 25 through conduit 53; and the undistilled residue is withdrawn through outlet conduit 54. The liquid mixture is heated and dispersed in fine droplets by action of upper plate 25, the dissolved air and low-boiling components being released. The residual liquid is caught in annular trough 55 and flows through pipe 56 to the next lower plate. The vapors are withdrawn through conduits 14, 15.

When the apparatus of Fig. 1 is used as a column still, the conduits 14, 15 are sealed. The liquid to be distilled, preferably after being preheated and degassed in a separate preheating unit, is delivered to one of the intermediate plates 25 through conduit 59. Some vaporization occurs. The unvaporized liquid is thrown from the periphery of the rotating plate and is caught in the adjacent trough 55 and delivered to the plate 25 immediately below it. The vapors rising from each plate contact the spray of unvaporized liquid in an annular space between each higher plate 25 and the associated trough 55, thereby providing a high degree of interdiffusional exchange. The vapors formed at the top late 25 and those rising from below it are withdrawn through a conduit 60 and are condensed in well known manner. A selected portion of the condensate preferably is returned to the still as reflux through conduit 53.

Fig. 2 illustrates a modification especially adapted for vacuum distillations that must be carried out at pressures below 0.1 mm. of mercury. Referring to that figure, 70 designates a vacuum-tight column still, having head and base plates 71 and 72. Mounted on head plate 71 is a housing 22, induction motor M and associated parts, similar to the corresponding parts described in connection with Fig. 1. (See also Fig. 3 for a modified motor support and bearing structure.) Likewise, mounted upon the housing 22 for the induction motor is a heat-regulating solenoid-operated braking element and associated parts similar to that hereinbefore described. For convenience, similar numerals designate similar parts in Figs. 1 and 2.

A hollow vertical shaft 75 is mounted in the still 70 for rotation on its longitudinal axis. The shaft has its upper end guided and supported in bearings 21, 21'; and is secured to rotor shaft 24 by suitable means. The lower end of shaft 75 is centered in and extends downwardly through a packing gland 76 formed on a partition or plate 77. The latter is secured to the still walls; and has a plurality of apertures 78 establishing free communication between the distillation chamber 79 and a liquid sump 80 on the respective sides of partition 77.

Rigidly secured upon shaft 75 are a plurality of spaced heating or vaporizing plates 82, and cooling or condensing plates 84. Preferably the plates are arranged in spaced pairs, with a condensing plate 84 being disposed immediately above an associated vaporizing plate 82, as shown in Fig. 2. Each plate 82 is similar to the previously described plates 25, excepting that in the former an annular passage 85 therethrough is provided adjacent shaft 75 and is surrounded by a splash shield 86. This eliminates pressure drop between successive plate units during use, while preventing liquid discharge into the passage 85.

As already indicated, an induction motor M and associated parts similar to those previously described are provided for rotating the shaft 75 and the plates 82, 84 at a selected speed, and for supplying energy for heating plates 82. The plates 82 are heated in the same manner as the plates 25, as hereinbefore described.

For providing additional heat for each of said vaporizing plates, and for regulating the temperature of such plates, a solenoid-operated braking plate 43 and associated parts are provided, similar to those already described.

For cooling the condensing plates 84, each of the latter is provided with a suitable passage 88 for a cooling liquid. This liquid preferably is the same as the liquid to be recovered by the distillation; or it may be a liquid which is not reactive with the substance being distilled and which has a very low vapor pressure under the conditions of the distillation. Each passage 88 is connected in series in a passage 89 for the cooling fluid, located within the shaft 75. A rotary or centrifugal pump P, having an inlet 90 disposed below the surface of a body of cooling liquid in sump 80, is secured to the lower end of shaft 75 and is supported by a suitable thrust bearing 95 suitably retained on a spider 97 secured to the still wall for rotation in a housing 91 mounted upon partition 77. A partition 92, disposed between the vanes 93 of pump P and the plate 77, has therein apertures 94 establishing communication between the pump and the inlet end of passage 89 in shaft 75. The outlet end of the passage 88 in the uppermost plate 84 is connected with a casing 96 surrounding shaft 75 and secured thereto. The casing 96 is open at the lower end, and provides an annular passage discharging the heated cooling fluid into the lower part of chamber 79, whence it flows to sump 80. For facilitating the dissipation of heat from the cooling liquid returning to sump 80, the outer surface of the column at the sump is provided with spaced annular fins 98 or the equivalent of metal of high heat conductivity.

Secured to the inner walls of still 70 at a level immediately below the upper surface of each vaporizing plate 82 is a corresponding member forming with the still wall an annular trough 100. Conduits 102 conduct unvaporized liquid and residues from each trough 100 to the inner margin of the upper surface of the next lower vaporizing plate 82. The liquid to be distilled is fed to the inner margin of the uppermost plate 82 through inlet line 104. Undistilled residue is withdrawn from the lowermost trough 100 through conduit 105.

Secured to the inner walls of the still 70 at a point immediately below the lower surface of each condensing plate 84 is a corresponding member defining with said wall an annular trough 107. Conduits 108 respectively conduct from the still liquid condensed on the lower surface of the associated plate 84 and thrown therefrom by centrifugal force. Vapor conduits 109, connected with high vacuum pumps (not shown), conduct vapors to a suitable condensing and recovery system.

In the normal operation of the apparatus of Fig. 2. a suitable cooling liquid is placed in sump 80. The primary electric circuit of motor M, which includes the stator windings, is energized, thereby rotating rotor 23 and the shaft 75 and associated plates 82, 84 at a selected rate. Concurrently the electric current or energy induced or set up in the rotor flows to the heating elements in the vaporizing plates and heats each of the latter to a selected temperature. The heating elements 27 may be designed to provide the same temperature or a higher temperature at each succeeding lower vaporizing plate 82. The operator thus can obtain as distillate any selected fraction of the liquid fed to the still.

Where the electric current set up in the rotor is insufficient to heat plates 82 to the required temperature, the brake plate 43 is actuated by energizing solenoid S by a current flowing through variable resistance 48. The brake retards slightly the speed of the rotor, thus increasing the magnetic torque associated with the rotor. Increased energy is generated and flows from the rotor to the heating elements 27, thereby raising the plate temperature without materially reducing the rate of plate rotation effective for moving the liquid over and from the plate. Rotation of shaft 75 causes pump P to circulate cooling fluid through the passages in plates 84, and to and from the sump 80.

After the plates are rotating at the desired rate, and the plates 82 and 84 are at the desired temperatures, the liquid to be distilled, which preferably has been degassed in a preheating operation, is fed to the uppermost plate 82 through line 104. The plates conveniently may be rotated at a rate between 1500 and 1700 revolutions per minute, although much higher and lower rates of revolution may be used. Plates 82 likewise may be maintained at temperatures within the range between 100° and 250° C., although obviously temperatures below and above this range likewise may be used. A portion of the liquid fed to the upper plate 82 is vaporized; and part of the vapors may be withdrawn through outlet 109. Another portion of such vapors rises and is condensed on the under surface of upper rotating plate 84 and then is thrown from the outer margin of that plate into distillate trough 107 and is withdrawn from the still. The unvaporized portion of the feed liquid is thrown by centrifugal force as a spray into trough 100 from whence it flows through line 102 to the next lower heating plate 82, where the aforesaid series of vaporizations, condensations and withdrawals are repeated. The unvaporized liquid residue thrown from the lowermost plate 82 is withdrawn from the still through line 105.

During operation liquid is pumped from sump 80 by pump P through line 89 and each succeeding higher cooling plate 84. The liquid returns to the sump 80 through the annular passage in casing 96 and the passages in partition 77. The packing gland 76 prevents leakage of cooling liquid between pump P and passage 89. The cooling liquid, during operation, preferably is maintained at temperatures at which it is not viscous, and temperatures around 50° to 100° C. are especially suitable.

It will be understood that the apparatus shown in the drawings is susceptible of considerable modification without departing from the spirit of the invention. For example, the heating plates and the condensing plates, respectively, may be disposed in pairs, one pair above the other, for reducing heat losses. The number and size of the respective heating plates and condensing plates may be varied to meet the requirements of a particular fractionation. In like manner, other means besides the solenoid shown may be used for regulatably throwing the rotor out of synchronism with the stator's rotating magnetic field to increase the current generated in the rotor windings. Since the interiors of the still housings 11 and 70, and the housings 22 and 39 for the rotor and the rotor braking mechanism need not be and normally are not hermetically sealed from each other, the housings 22 and 39 may be regarded as parts of the still housing and may be subject to vacuum.

The present invention provides for the first time a distillation process and apparatus that combines (1) the advantages of high vacuum short path distillation in which vaporizing and condensing surfaces are separated by unobstructed space, with (2) an extremely high rate of heat transferred by diffusion requiring rapidly moving parts within the still utilizing (3) means sealed from the atmosphere and enclosed within a vacuum-tight casing for driving the moving parts and for generating and regulating the heat required for the distillation. The absence of any moving parts extending through the still walls greatly facilitates the maintenance of the desired high vacuum within the still.

The invention is susceptible of modification within the scope of the appended claims.

We claim:

1. The process of distilling liquids under high vacuum conditions, which comprises maintaining in a highly vacuumized zone at least one heated, rotating vaporizing surface positioned to discharge unvaporized liquid from its outer margin by centrifugal action, introducing a stream of a liquid to be distilled upon a midportion of said surface while heating such surface to a temperature sufficient to volatilize at least a portion of said liquid, and while rotating the surface at a speed subjecting the liquid to sufficient centrifugal force to distribute it upon said surface and to discharge unvolatilized liquid from the outer margin thereof, withdrawing volatilized portions of the liquid from said vacuumized zone, separately withdrawing unvolatilized residue from said zone, and effecting the heating of said rotating surfaces and the rotation of such surfaces by energy generated magnetically within said vacuumized zone and regulated from without such zone.

2. The process of distilling liquids under high vacuum, unobstructed path conditions, which comprises maintaining in a highly vacuumized zone a plurality of pairs of closely adjacent rotatable surfaces, one surface of each pair being heated and adapted to serve as a vaporizing surface, and the other of each pair being cooled and adapted to serve as a condensing surface; introducing a stream of a liquid to be distilled at a midportion of each vaporizing surface while heating such surface to a temperature sufficient to vaporize at least a portion of said liquid, and while rapidly rotating such surface to discharge unvaporized liquid from the outer margin by centrifugal action; regulating the temperature of said vaporizing surfaces; concurrently condensing on each condensing surface a portion of the vapors formed at the adjacent vaporizing surface, and discharging the resultant condensate laterally of said condensing surface; circulating a cooling fluid in heat-exchange relation with each of said condensing surfaces; and effecting the heating of said vaporizing surfaces, the rotation of the respective surfaces, and the said circulation of cooling fluid by energy generated magnetically within said vacuumized zone.

3. The process of distilling liquids under high vacuum, unobstructed path conditions, which comprises maintaining in a highly vacuumized zone a plurality of pairs of closely adjacent rotatable surfaces, one surface of each pair being heated and adapted to serve as a vaporizing surface, and the other of each pair being cooled and adapted to serve as a condensing surface; introducing a stream of a liquid to be distilled at a midportion of each vaporizing surface while heating such surface to a temperature sufficient to vaporize at least a portion of said liquid, and while rapidly rotating such surface to discharge unvaporized liquid from the outer margin by centrifugal action; regulating the temperature of said vaporizing surfaces; concurrently condensing on each condensing surface a portion of the vapors formed at the adjacent vaporizing surface, and discharging the resultant condensate laterally of said condensing surface; circulating a cooling fluid successively in heat-exchange relation with each of said condensing surfaces; and effecting the heating of said vaporizing surfaces, the rotation of the respective surfaces, and the said circulation of cooling fluid by energy generated magnetically within said vacuumized zone and regulated from outside said zone.

4. Apparatus for the separation of constituents of a mixture distillable under high vacuum conditions, which comprises a vacuum-tight housing; a series of spaced rotatable vaporizing surfaces withi said housing; heating means operatively associated with each of said surfaces; means for conducting volatile constituents of the mixture from said housing; means for conducting unvolatilized residue from said housing; and means within said housing and energized magnetically through the housing wall for rapidly rotating said vaporizing surfaces at a selected rate and for generating the energy utilized by said heating means for heating the same; means outside of the said housing and adapted to energize said energy-generating means; and means for regulating the amount of energy thus generated.

5. In apparatus for high vacuum distillation, wherein a liquid to be distilled is distributed over a plurality of heated vaporizing surfaces in succession within a vacuumized zone, the improvement which comprises a vacuum-tight still; a series of vertically-spaced rotatable heated vaporizing surfaces within said still; means for rapidly rotating each of such surfaces by magnetic action, which means includes a rotor within the still walls, a stator sealed from the rotor by said still walls, and a rotatable shaft connected with said rotor and supporting said vaporizing surfaces for rotation; an electric heating circuit comprising an electric conductor in said rotor, electric heating elements respectively operatively associated with said vaporizing surfaces, and insulated electric conductors separately connecting each heating element with the conductor in said rotor; means for setting up a rotating magnetic field in said stator; means independent of the last-named means, and totally enclosed within said still, for regulating the electric current generated in the said rotor conductor and for adjusting the heat produced by each heating element; means for conducting volatile constituents of said mixture from said housing; and means for conducting unvolatilized residue from said housing.

6. Distillation apparatus for the separation of constituents of a mixture under high vacuum, which comprises a vacuum-tight housing; a series of spaced rotatable members having vaporizing surfaces within said housing; means for rapidly rotating said members and vaporizing surfaces, and comprising a rotor totally enclosed within said housing, and a stator disposed outside of said housing; an electric current-generating and heating unit totally enclosed within said housing, comprising conductors for electric and magnetic fields carried by said rotor, electric heating elements respectively associated with said rotatable members, and insulated electric connections between the rotor conductor and said heating elements; means for varying the amount of electric current generated by said generating and heating unit, said last-named means comprising mechanism for varying the extent to which the rotating magnetic field of the rotor is out of synchronism with that of the stator; means for conducting volatile constituents of said mixture from said housing; and means for conducting unvolatilized residue from said housing.

7. Distillation apparatus for the separation of constituents of a mixture under high vacuum, which comprises a vacuum-tight housing; a series of spaced rotatable members having vaporizing surfaces within said housing; means for rapidly rotating said members and vaporizing surfaces, and comprising a rotor totally enclosed within said housing, and a stator disposed outside of said housing; an electric current-generating and heating unit totally enclosed within said housing, comprising conductors for electric and magnetic fields carried by said rotor, electric heating elements respectively associated with said rotatable members, and insulated electric connections between the rotor conductor and said heating elements; means for varying the amount of electric current generated by said generating and heating unit, said last-named means comprising mechanism sealed from the atmosphere and operatively connected with the rotor, for varying the extent to which the rotating magnetic field of the rotor is out of synchronism with that of the stator, and magnetic means actuated outside of the still for energizing said mechanism; means for conducting volatile constituents of said mixture from said housing; and means for conducting unvolatilized residue from said housing.

8. Self-contained apparatus for the separation of constituents of a mixture distillable under high vacuum, unobstructed path conditions, which comprises a vacuum-tight housing; a series of pairs of closely adjacent rotatable surfaces, one surface of each pair being provided with heating means and adapted to serve as a vaporizing surface; the other surface of each pair being provided with cooling means and being adapted to serve as a condensing surface; means for conducting a liquid onto each of the vaporizing surfaces in succession; means for withdrawing undistilled residue from the housing; a reservoir for a cooling fluid; and means entirely enclosed within said housing but energized from without the housing for rotating said surfaces, for generating energy for heating said heating means, and for circulating a cooling fluid through each of said cooling means and through said reservoir.

9. Self-contained apparatus for the separation of constituents of a mixture distillable under high vacuum, unobstructed path conditions, which comprises a vacuum-tight housing; a series of pairs of closely adjacent rotatable surfaces, one surface of each pair being provided with heating means and adapted to serve as a vaporizing surface; the other surface of each pair being provided with cooling means and being adapted to serve as a condensing surface; means for conducting a liquid onto each of the vaporizing surfaces in succession; means for withdrawing undistilled residue from the housing; a reservoir for a cooling fluid; magnetically-controlled means entirely enclosed within said housing but energized from without the housing for rotating said surfaces, for generating the energy providing heat at said heating means, and for circulating a cooling fluid through each of said cooling means and through said reservoir; and means for regulating the amount of energy generated by said magnetically-controlled means, and convertible to heat energy.

10. In apparatus for high vacuum distillation under unobstructed path conditions, wherein a crude liquid is distributed over a heated vaporizing surface in close proximity to a cooled condensing surface, the improvement which comprises a vacuum-tight still; a plurality of pairs of closely-spaced rotatable surfaces, one surface of each pair being provided with a heater and adapted to serve as a vaporizing surface, and the other of each pair being adapted to be cooled and to serve as a condensing surface; means for rapidly rotating each of said surfaces by purely magnetic action transmitted through the still walls, which means includes a rotor within the still, a stator sealed from the rotor by the still walls, and a rotatable shaft connected with said rotor and adapted to support said vaporizing surfaces and condensing surfaces for rotation with the rotor; an electric heating circuit totally enclosed within said still and comprising an electrical conductor in the rotor, a plurality of electric heating elements respectively associated with a corresponding vaporizing surface, each of said heating elements being independently connected with the conductor in the rotor by means of insulated conductors; means enclosed within said still and magnetically controlled from without the still for regulating the current flow to the respective heating elements; and rotary impeller means within said still and operatively connected with said rotor for circulating a cooling fluid in heat-exchange relation successively with each of said condensing surfaces and thereafter with a surface adapted to abstract heat from said fluid.

11. Distillation apparatus for the separation of constituents of a mixture distillable under high vacuum, unobstructed path conditions, which comprises a vacuum-tight housing; a series of pairs of closely adjacent rotatable members, one of each pair thereof having heating means connected therewith and having a surface adapted to serve as a vaporizing surface, and the other of each pair being provided with cooling means and having a surface adapted to serve as a condensing surface; means for conveying liquid being distilled onto the vaporizing surfaces in succession; mechanism for rotating said rotatable members and for circulating a cooling fluid through each of said cooling means, said mechanism comprising an induction motor having a rotor totally enclosed by said housing, a stator disposed outside of the housing, and a shaft supporting said rotatable members and operatively connected with said rotor for rotation therewith; a cooling fluid reservoir within said housing; and a liquid circulating pump driven by said rotor and having an inlet within said reservoir and an outlet connected in series with the respective cooling means associated with successive condensing surfaces.

12. Distillation apparatus for the separation of constituents of a mixture distillable under high vacuum, unobstructed path conditions, which comprises a vacuum-tight housing; a series of pairs of closely adjacent rotatable members, one member of each pair thereof being provided with heating and vaporizing means and having a surface adapted to serve as a vaporizing surface, and the other of each pair being provided with cooling means and having a surface adapted to serve as a condensing surface; means for conveying liquid being distilled onto the vaporizing surfaces in succession; mechanism for rotating said rotatable members and for circulating a cooling fluid through each of said cooling means, said mechanism comprising a rotor having conductors for magnetic and electric fields totally enclosed by said housing, a shaft supporting said rotatable members and operatively connected with the rotor for rotation therewith, and a rotary pump driven by said rotor; and means disposed outside of the housing for inducing a magnetic flux within said rotor, thereby rotating the latter and associated rotatable members and actuating the pump.

ROBERT F. SCOTT.
ARGYLE C. PLEWES.